April 18, 1944.  G. A. TINNERMAN  2,346,712
FASTENING DEVICE
Filed Dec. 22, 1938

INVENTOR.
GEORGE A. TINNERMAN
BY Bates, Goldrick, & Teare
ATTORNEYS

Patented Apr. 18, 1944

2,346,712

UNITED STATES PATENT OFFICE 2,346,712

FASTENING DEVICE

George A. Tinnerman, Rocky River, Ohio, assignor, by mesne assignments, to Tinnerman Products, Inc., Cleveland, Ohio, a corporation of Ohio Application December 22, 1938, Serial No. 247,158

19 Claims. (Cl. 85—36)

This invention relates to a sheet metal nut and particularly to one which is adapted to be used in an assembly where it is necessary for the fastener to retain itself in bolt receiving position prior to the insertion of the bolt. The invention is more particularly concerned with an improved self-locking nut having means formed as an integral part thereof to secure the nut to the structure with which it engages. In this respect the present application is a continuation in part of my copending application, Serial No. 119,415, filed January 7, 1937.

An important purpose of the present invention is the provision of means formed as an integral part of the nut for securing it to the structure with which it contacts in such manner than it is not only fixedly held in position, but that the perforation in the structure through which the nut attaching means passes is closed or sealed by the securing means. Fasteners for accomplishing this purpose are useful for example in the assembly of an automobile body, parts of which are accessible from only one side, and wherein the opening through which the fastener is passed must be sealed to prevent the entrance of water and other foreign matter. A suitable location for an assembly of this nature is the fender of an automobile body.

Additional uses for fasteners of this nature is in refrigerator cabinets where it is essential that the insulation carrying compartment be sealed against the entrance of moisture. Moreover, the invention finds utility in railway cars, airplanes, steel tanks, furnaces and associated types of product.

A further object of the invention is to provide a sheet metal nut which is so formed that the threaded element engaged thereby may be readily removed in the event that the threads thereof are stripped.

An additional object is to provide an improved method of securing a nut to a structure with which it is associated involving an application of the nut from the side of the structure opposite from that with which the nut contacts when it is in holding position, whereby the nut cannot be disengaged from the side of the structure with which it contacts.

Figure 1:
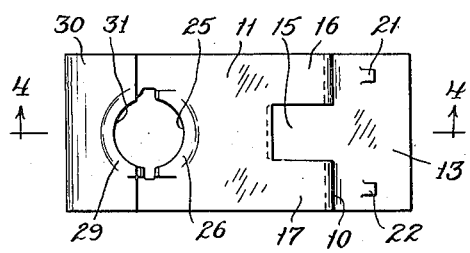
Figure 3:
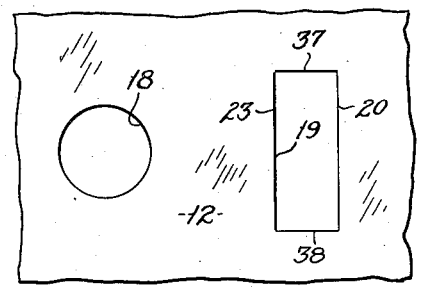
Figure 2:
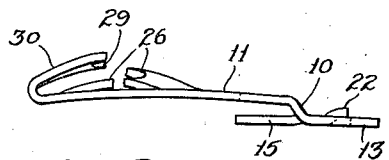
Figure 4:
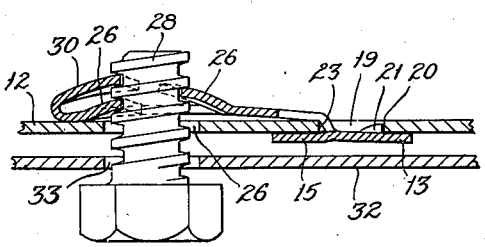
Figure 5:
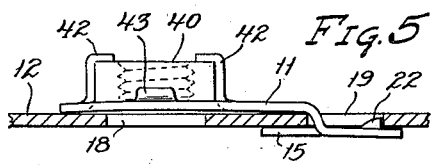
Figure 6:
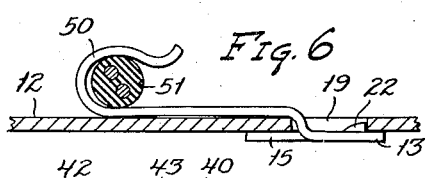
Figure 9:
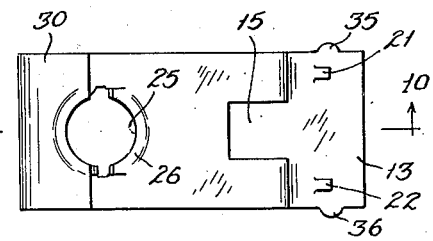
Figure 7:
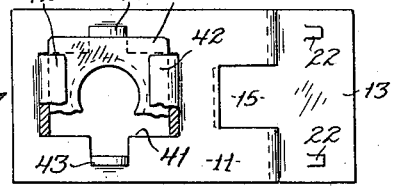
Figure 10:
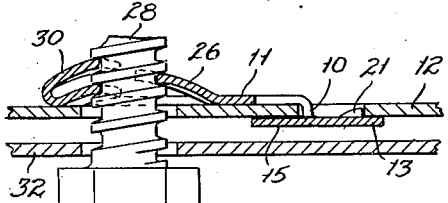
Figure 8:
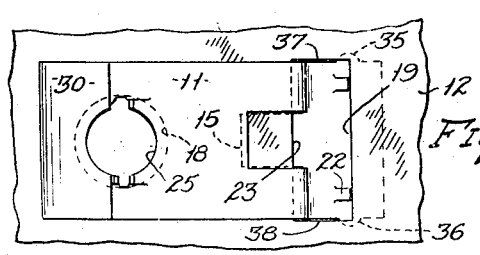

Referring now to the drawing, Fig. 1 is a top plan view of one form of sheet metal nut constructed in accordance with the present invention; Fig. 2 is a side view of a fastener shown in Fig. 1; Fig. 3 is a top plan view of an article having openings therein for receiving the fastener and for receiving a threaded member with which the fastener is intended to be used; Fig. 4 is a vertical section taken through a plurality of parts that are joined together by means of a fastener embodying the present invention; Figs. 5 and 6 are sections taken through an article having a fastener positioned thereon and embodying modifications of the structure shown in Figs. 1 and 2; Fig. 7 is a top plan view of the assembly shown in Fig. 5; Fig. 8 is a top plan view of an article having a further modified form of fastener attached thereto; Fig. 9 is a top plan view of the fastener shown in Fig. 8, and Fig. 10 is a section taken on the line 10—10 of Fig. 9.

Referring first to Figs. 1 to 4 inclusive, the fastener comprises a strip of sheet metal that is offset intermediate its ends as at 10 to provide a nut carrying arm 11 that is disposed on one side of an article 12, and to provide another arm 13 that is adapted to engage the opposite side of the article 12. The arms 11 and 13 are disposed in approximately parallel planes.

To hold the fastener securely in place upon an article, I prefer to utilize a tongue 15 which lies substantially in the same plane as the arm 13 and which is formed from the arm 11 by being struck downwardly therefrom. The tongue is spaced from the arm sufficiently far to admit the article 12 and to make a snug fit therewith. The severing of the arm 11 to make the tongue 15 leaves a U-shaped opening in the arm and provides two tongues 16 and 17 adjacent the offset 10.

The article 12 is shown as having a bolt-receiving aperture 18 and a fastener receiving aperture 19 therein. The aperture 19 serves as an opening through which the arm 13 may be passed until the tongue 15 engages the bottom of the article. At such time, the aperture is sealed by the arm 13 against the entrance of water or other foreign matter. Then, to lock the fastener in position on the plate, I have shown prongs 21 and 22 which are preferably struck upwardly from the arm 13 for engagement with the wall 20 of the aperture 19. The offset portion 10 engages the opposite wall 23 wherefore the fastener is securely locked in position on the article 12 with the tongue 15 and part of the arm 13 underlying one surface thereof.

To assemble the fastener of Fig. 4 onto the article, the arm 11 is passed upwardly through the opening 19 and is then tilted until that portion of the article adjacent the wall 23 enters the crotch formed by the tongues 15, 16 and 17, and thereupon the fastener is forced forwardly until the prongs 21 and 22 snap into position against the wall 20. At such time, the opening 18 is in registration with the bolt receiving opening 25 in the arm 11.

The arm 11 is adapted to carry bolt thread engaging means and so I have illustrated various forms for such purpose. In Figs. 1 to 4, the metal in the arm 11 adjacent the bolt opening 25 is formed to engage a thread on a bolt indicated for example at 28. The bolt thread engaging portions may take the form of a split conical protuberance 26 wherein the portion adjacent the wall of the opening 25 is shaped to conform to the helix of the thread on the bolt with which the fastener is intended to be used. Additional engagement of the bolt threads may be made by extending the end of the arm upwardly and inwardly to make an arm 30, the end of which is provided with a notch 31 and is likewise shaped as at 29 to conform to the helix of the bolt thread; but to engage a different turn from that engaged by the portion 26. The fastener has a thickness less than the pitch of the bolt thread and hence the thread engaging portions make contact readily with the bolt in an expeditious manner.

The thread engaging portion operates to lock the bolt thread securely in place and at the same time to permit removal of the bolt in the event that the threads are stripped. In Fig. 4, for example, the shank of the bolt 28 is shown as passing through an aperture 33 in a part 32 and illustrates the bolt in the act of being threaded into engagement with the fastener. The fact that the arm 30 does not completely encircle the bolt shank enables it to be withdrawn whenever desired, without disturbing the part to which the fastener is attached.

In the modification of Figs. 8, 9 and 10, the fastener construction is similar to that described in connection with Figs. 1, 2 and 4 and the like parts bear the same reference characters. It differs however from that previously described in that the arm 13 has laterally projecting tabs 35 and 36 which extend beneath the part 12 and beyond the edges 37 and 38 of the opening 19. Thus, when the fastener is assembled as shown in Fig. 8, portions of the arm 13 underlie the part 12 on all sides of the opening 13. This arrangement makes a secure locking engagement between the fastener and the part 12 and assures an effective seal of the opening 19.

The modification of Fig. 5 and Fig. 7 shows a fastener which has substantially the same construction as that shown in Figs. 1 and 2 except for the means by which engagement is made with a bolt or other article. In Fig. 5, the bolt thread engaging means comprises a nut 40, that is suitably threaded to receive the bolt, and that has its opening in registration with an opening 41 in the arm 11. The opening 41 is the space left in the arm 11 after the tabs 42 and 43 have been formed therefrom. These tabs provide means for holding the nut against rotation on the arm 11.

The modification of Fig. 6 illustrates a fastener having the same means for attaching it to a plate after it has been passed through an opening therein, but it differs in that the article receiving portion comprises a loop 50 for receiving an article such as a tube cable or similar form indicated in general at 51. The function of the loop is that of exerting a yielding pressure against the article for holding it firmly in place after it has been snapped into position upon the fastener.

From the foregoing description it will be apparent that a fastener made in accordance with the present invention may be made in a simple manner and may be effectively locked in place against the part with which it is intended to be attached and that it will be effectively held against movement with reference thereto until the bolt is inserted therein.

I claim:

1. A self-locking nut comprising a sheet metal strip consisting in a tongue-like part having an opening, the wall of which is formed to provide a self-locking thread, and means to secure said strip to a structure with said opening in substantial alignment with an aperture in said structure for the passage of a threaded fastener, said means comprising portions disposed in a plane substantially parallel to said part and attached to one end of said part, said portions extending forwardly, rearwardly and laterally of said end.

2. A self-locking nut comprising a strip of sheet metal having an opening, the wall of which is formed to provide a self-locking thread, said strip having a part containing said opening to pass through a perforation in a structure, and portions disposed in a plane offset with respect to said part and formed to underlie said structure, forwardly, rearwardly and at each side of said perforation.

3. A sheet metal nut and a nut-securing means comprising a sheet metal element having an elongated part provided with a split conical protuberance having an opening for the passage of a threaded element, the wall of said opening providing a helical thread, said part providing a tongue for passage through a perforation in a structure to which the nut is to be secured, portions of said sheet metal element extending in opposite directions from one end of said part and in parallelism thereto to underlie said structure at opposite sides of said perforation, and the other end of said tongue being return-bent and having a notch, the wall of which is approximately aligned with a portion of said first named wall.

4. A fastener for attachment to a structure having a bolt receiving opening therein and an aperture spaced from the opening, comprising a sheet metal strip, a nut, means for positioning the nut on the strip in registration with the bolt receiving opening of said structure, the strip having a portion thereof extending through the aperture and underlying the structure, said strip having prongs deformed therefrom for engaging a wall of the aperture and having a tongue disposed adjacent the opposite wall of the aperture and underlying said structure, said tongue and prongs cooperating to hold the strip on the structure in such manner as to seal the aperture.

5. A fastener for attaching an article to a structure having an opening therein, comprising a one-piece strip of sheet metal having one end thereof return-bent to provide an article receiving portion and having the other end offset to underlie said structure, said strip having a tongue deformed therefrom and lying in substantially the same plane as the offset portion and also underlying the structure, and said offset portion having means deformed therefrom for engaging the wall of the aperture, said means cooperating with the tongue to position the strip upon the structure.

6. A fastening device for positioning an article upon a structure having an aperture therein, said device comprising a strip of sheet metal having one end thereof bent upwardly to form a loop into which the article may be yieldably held, said strip having an offset portion adjacent the other end thereof, the offset portion having means deformed therefrom for engaging a wall of the aperture, said means comprising spaced prongs that extend out of the plane of the offset portion, and other means disposed in the plane of the offset portion for cooperating with the prongs to lock the fastener to the structure, said means including a tongue that underlies the structure adjacent the sides of the aperture opposite the side engaged by the prongs.

7. A fastener comprising a sheet metal strip adapted to be passed through an aperture in a structure and having an imperforate surface extending across and sealing the aperture, said strip being offset intermediate the ends thereof to provide one portion which underlies the structure and another part which overlies the structure, the underlying portion having a prong struck upwardly therefrom for engaging a wall of the aperture and for locking the fastener to the structure, and the overlying portion extending substantially parallel to the underlying portion and bearing against said structure.

8. A fastener for attachment to a structure having a bolt receiving opening therein and having an aperture spaced from the bolt opening, comprising a one-piece sheet metal strip that is offset intermediate its ends to provide an underlying portion and an overlying portion, the underlying portion sealing the aperture and having spaced prongs engaging the wall of the aperture, said strip having a tongue extending laterally of the underlying portion for cooperating with the prongs to lock the fastener upon the structure and said overlying portion having a bolt receiving opening therein and having the metal adjacent the opening shaped to conform to the thread of a bolt with which the fastener is intended to be used, and said strip having one end thereof extending upwardly and inwardly to engage another turn of the bolt thread.

9. A fastener for attachment to a structure having a bolt receiving opening and an aperture therein, comprising a sheet metal strip that is offset intermediate its ends to provide an underlying portion and an overlying portion, the underlying portion sealing the aperture and engaging the structure on all sides of the aperture and the overlying portion having means thereon for engaging more than one turn of the thread on a bolt which extends through said opening.

10. A fastener for attachment to a structure having a bolt receiving opening and an aperture therein comprising a sheet metal strip that is offset intermediate its ends to provide an underlying portion and an overlying portion, the underlying portion sealing the aperture and having a prong formed therefrom for engaging a wall of the aperture, and said strip having a tongue extending laterally of the underlying portion and cooperating with the prong to lock the fastener onto the structure, and means on the overlying portion in registration with the opening in the structure for engaging the threads of a bolt that is passed through said opening.

11. A sheet metal nut and securing means for attachment to a structure having a bolt receiving opening therein and an aperture spaced from the opening comprising a strip of metal consisting of a body and a part projecting laterally of said body and carrying a bolt thread engaging portion, and means for holding the thread engaging portion in registration with the bolt opening, said means comprising an extension and a tongue also projecting laterally of said body, said extension and tongue being disposed in the same plane, and sealing the aperture when said thread engaging portion is in registration with the bolt opening and said body and tongue lying in substantially parallel planes and being spaced apart sufficiently to receive a portion of the structure to which the nut is to be secured.

12. A self-locking nut, comprising a sheet-metal strip consisting in a tongue-like part having an opening, the wall of which is formed to provide a self-locking thread, and means to secure said strip to a structure with said opening in substantial alignment with an aperture in said structure for the passage of a threaded fastener, said means comprising portions disposed in a plane substantially parallel to said part and attached to one end of said part, said portions extending forwardly, rearwardly and laterally of said end, and sealing a second aperture in said structure into which a portion of said strip extends.

13. A self-locking nut, comprising a strip of sheet-metal having an opening and having means thereon for receiving a threaded fastener that passes through an aperture in a structure, said strip having a part containing said opening to pass through a perforation in said structure, and portions disposed in a plane offset with respect to said part and formed to underlie said structure, forwardly, rearwardly and at each side of said perforation and thereby to seal said perforations.

14. A sheet-metal nut and a nut-securing means, comprising a sheet-metal element having an elongated part provided with a split conical protuberance having an opening for the passage of a threaded element which extends through an aperture in a structure to which the nut is to be secured, the wall of said opening providing a helical thread, said part providing a tongue for passage through a perforation in said structure, portions of said sheet-metal element extending in opposite directions from one end of said part and in parallelism thereto to underlie said structure at opposite sides of said perforation, and the other end of said tongue being return-bent and having a notch, the wall of which is approximately aligned with a portion of said first-named wall.

15. A fastening device comprising a sheet metal strip of uniform width throughout its length and applicable to a part to be joined through an assembly slot therein, the fastener having one portion overlying the part and another portion underlying said part, one of said portions having means formed thereon for engaging one turn of a threaded member and having the end thereof bent upwardly and inwardly and engaging another turn of the threaded member, said fastening having a shoulder adjacent the junction of the overlying and underlying portions and having means for engaging the opposite wall of the slot in the part to be joined and for locking the fastener to said part.

16. In combination a support provided with an assembling opening, a sheet metal fastening device comprising a body including a tongue struck out of the plane thereof and extending in spaced relation thereto, said tongue and body cooperating to engage opposite faces of the support through said opening and said body having an extension which substantially seals said opening and extends in the same general direction as the body, said extension being provided with means engageable with a side wall of said opening and cooperating with said tongue to lock the device in the applied fastening position and said body including means deformed therefrom adapted to receive a bolt fastening for retaining an object relative to the support.

17. In combination with a support provided with an assembling opening, a fastening device comprising a body including a tongue struck out of the plane of said body, said tongue and body cooperating to provide a crotch for receiving the support and engaging one wall of said opening and said body having an extension substantially sealing said opening in the applied fastening position, said extension including means engaging a wall of the opening opposite that engaged by the crotch of the fastening device to lock the device in such applied fastening position, said body comprising bolt receiving means for receiving a bolt fastening in securing an object with respect to the support.

18. The combination of a support provided with a bolt passage and an assembling slot, a part to be connected to said support and a connecting device comprising a body member carrying bolt engaging means and including an extension and a tongue struck therefrom to extend in spaced relation thereto, said body member being applicable through the assembling slot from one side of the support to be positioned on the opposite side thereof, with the bolt engaging means overlying the bolt passage and in position to receive a bolt fastening to connect said part to the support, said body member and tongue cooperating to engage opposite faces of the support in maintaining the connecting device in applied fastening position thereon, said extension substantially sealing the slot and including means engaging a wall thereof to lock the device in such applied fastening position.

19. The combination of a support provided with a bolt passage and an assembling slot, a part to be connected to said support and a one-piece sheet metal connecting device comprising a body member having integral bolt engaging means deformed therefrom, said body member including an extension and a tongue struck therefrom to extend in spaced relation thereto, said body member being applicable through the assembling slot from one side of the support to be positioned on the opposite side thereof with the bolt engaging means overlying the passage and in position to receive a bolt fastening to connect said part to the support, said body member and tongue cooperating to engage opposite faces of the support in maintaining the connecting device in applied position thereon, said extension substantially sealing the slot and being provided with means for engaging a side wall thereof to lock the device in such applied fastening position.

GEORGE A. TINNERMAN.